** 3,501,401
Patented Mar. 17, 1970**

**3,501,401
CONDENSATION PURIFICATION PROCESS**
Calvin Calmon, Arneys Mount, Springfield Township, N.J., assignor to Sybron Corporation, Rochester, N.Y., a corporation of New York
No Drawing. Filed May 22, 1969, Ser. No. 827,055
Int. Cl. B01d 15/06
U.S. Cl. 210—33                                    10 Claims

ABSTRACT OF THE DISCLOSURE

Regeneration of the anion exchange resin portion of a mixed bed demineralizer with caustic followed by contacting the anion exchange resin particles with a solution containing ions having a rational thermodynamic equilibrium constant greater than either sodium or the ammonium ion substantially reduces sodium ion leakage into condensate water effluent due to replacement of sodium ions from cation exchange resin particles entrained in the anion exchange resin on separation of the mixed bed to its constituents. Calcium hydroxide solution is preferred.

FIELD OF INVENTION

This invention relates to the regeneration of demineralizers containing a mixed bed of particulate anion and cation exchange resin.

BACKGROUND OF THE INVENTION

In many applications, such as for example, in steam turbine power plant systems, it is of great importance to provide water for steam generator which is free of solid content, the presence of which produces surface coatings within the turbine, boiler and conduits. Even though the condensate water is recircuated in a closed system, there is aways accumulation of solid forming precursors due to addition of make up water, corrosion of metals, possible leakage and the like.

The method for the removal of such precursors is to pass the condensate through cation and anion exchange resins to remove any such precursor cations and anions by the exchange thereof with hydrogen and hydroxide ions of the exchange resins. The resins most frequently used are strong acid cation exchange resin and strong base anion exchange resins. Thus, the cations are exchanged for the hydrogen of the strong acid cation exchanger which upon release combines with the hydroxide of the strong base anion exchanger released by the exchange with the anions in the condensate. Although condensate water may be passed through cation and anion beds arranged in series, best results have been obtained when the anion and cation exchange resins are combined in a single mixed bed.

A major problem encountered with such mixed bed systems involves the regeneration thereof. Normally the anion exchange resin is regenerated with an alkali solution preferably sodium hydroxide, whereby the hydroxide replaces the anions contained on the exhausted resin. Regeneration of the cation exchange resin normally involves the use of a strong acid such as sulfuric or hydrochloric acid whereby the cations are replaced by the hydrogen ions of the acid. In mixed bed systems it is extremely difficult to completely separate the anion and cation resins. This is due to the fact that although normally there is sufficient difference in density between the two resins to conveniently allow for the hydraulic classification of the resins into separate layers, over a period of time a certain amount of the cation resin will be broken down into fine particles which become entrained in the anion exchange resin layer during hydraulic classification. Accordingly, when the anion exchange resin layer is regenerated, the cation exchange resin entrained in the anion exchange resin layer will be contacted by the alkali, conventionally sodium hydroxide, and will be put in the alkali cation form which in the conventional case will be sodium.

In normal operations the condensate water pH is adjusted above 9 in order to reduce the corrosive effect of the condensate. Such adjustment is carried out by the addition of ammonium hydroxide to the condensate water. During the subsequent operation of the mixed bed demineralizer, the ammonium ions in the condensate water replace the sodium ions of the entrained cation exchange resin particles thereby causing leakage of sodium ions into the condensate water. Although such leakage is small, i.e., on the order of a few parts per billion, such leakage is significant and highly undesirable in condensate systems.

This problem has been recognized by those in the art and numerous attempts to solve the sodium leakage problem connected with the regeneration of mixed bed demineralizers have been attempted. For example, extreme precautions may be taken to affect layering of the mixed bed resins to avoid the presence of cation resin in the anion resin layer. However, it has been found that even with great precautions substantial amounts of cation exchange resin, on the order of 1% or more, will be entrained in the anion exchange resin layer. This amount of cation exchange resin in the sodium form is sufficient to cause a serious leakage problem.

In addition, the precautions necessary to maximize resin separation make regeneration of the mixed bed very difficult, expensive and time consuming.

Another method of solving this problem has been disclosed by Crits et al. in Patent No. 3,385,787. This method involves first regenerating with caustic the anion exchange layer, including any entrained cation exchange resin particles and then subjecting the regenerated anion exchange layer to contact with an ammonium hydroxide solution which converts the entrained cation exchange resin from the sodium form to the ammonium form. In this way any cation which may be released by the entrained cation resin into the condensate system after mixing of the beds and passing condensate therethrough will be the ammonium cation which is compatible with the ammonia already present in the condensate to prevent corrosion. This method, however, is relatively expensive in that excessive amounts of ammonium ion are required to regenerate the 1% or more entrained cation exchange resin due to the fact that the thermodynamic equilibrium constants of the sodium ion and the ammonium ion are very close.

Another method involves the use of higher cross-linked cation exchange resins. It is well known that the greater the cross-linking of the cation exchange resin, the greater the density thereof. By increasing the density of the cation exchange resin, the separation of the cation exchange resin from the anion exchange resin, is thereby enhanced. However, even with higher cross-linked cation exchange resins, over a period of time certain of the resin particles will tend to be broken up thereby forming fines which will be entrained in the anion exchange resin layer.

Accordingly, it is an object of this invention to provide a process for regenerating mixed bed demineralizers whereby the leakage of cations due to entrained cation exchange resin is substantially reduced.

It is another object of this invention to provide a method for regeneration of mixed bed demineralizers whereby elaborate precaution in layering the resins prior to regeneration is avoided.

These and other objects and advantages of the present invention will become apparent upon consideration of the following detailed description and the novel features thereof will be particularly pointed out hereinafter in connection with the appended claims.

SUMMARY OF THE INVENTION

According to the present invention, I have found that the leakage of solid forming precursors from a mixed bed demineralizer due to the displacement thereof from cation exchange resin particles entrained with the anion exchange resin particles during the regeneration of said anion exchange particles, is substantially reduced when, following conventional regeneration of the anion exchange resin layer containing entrained cation exchange resin particles, said layer is contacted with a solution contained ions having a rational thermodynamic equilibrium constant greater than the rational thermodynamic equilibrium constant of the ammonium ion. In this manner, the sodium ions held by the entrained cation exchange resin particles after caustic regeneration of the anion exchange resin layer are readily replaced by the cations of the solution and during subsequent demineralization operation the cations, having a higher rational thermodynamic equilibrium than the ammonium ion constant, are not displaced by the ammonium ions present in the condensate water being treated. As a result the leakage of solid forming precursor cations from entrained cation resin particles of a mixed bed demineralizer into the condensate effluent is substantially reduced.

DESCRIPTION OF THE INVENTION

In carrying out this invention it is contemplated that conventional apparatus and conventional methods can be employed in demineralizing condensate water. Various mixed bed demineralizers are known in the prior art as is taught for example, in Patents 2,666,741 (McMullen); 2,692,244 (Kunin et al.) and 3,385,787 (Crits et al.). In such conventional apparatus there is provided a tank or container, a bed of intermixed anion and cation exchange resin particles disposed within the tank and inlet means for influent water and outlet means for effluent water. Normally the flow of liquid through the demineralizer is downward through the ion exchange bed although in certain cases it may be desirable to pump the solution being treated upwardly through the mixed ion exchange bed. In accordance with standard practice, the cation exchange resin is of the strong acid type such as for example a sulfonated polystyrene divinyl benzene cross-linked resin. The cation resin is normally in the hydrogen form in its regenerated state. The anion resin is normally a strong base type such as for example chloromethylated aminated syrene cross-linked with divinylbenzene. The anion resin is in the hydroxide form prior to use. The cation and anion resins are employed in particulate form, either being ground or being in the form of beads and, although not critical, preferably have an average particle size of −16 +40 mesh.

In normal operation condensate water being treated is passed through the ion exchange bed and the cations and anions of the water are exchanged for the hydrogen of the cation resin and the hydroxide of the anion resin while the exchanged ions are retained by the resin. This operation is continued until the exchange capacities of the ion exchange resins are reached and the resins are exhausted whereupon regeneration is effected as hereinafter described.

In regenerating a mixed bed demineralizer it is required at some stage in the regeneration to segregate the anion and the cation exchange resin particles. This is conventionally done by backwashing the demineralizer in order to expand and float the resin bed. The resin particles are then allowed to settle out with the heavier particles forming a lower layer and the lighter particles forming an upper layer. With most ion exchange resins, the cation exchange resin particles will be of heavier density than the anion exchange resin particles. Accordingly, the particles will settle out with the heavier cation exchange resin particles forming a lower or second layer and with the anion exchange resin particles overlying the cation exchange resin layer thereby forming an upper or first layer. As can be expected, however, the line of demarcation between the anion exchange resin layer and the cation exchange resin layer is indefinite. There will be found in the anion exchange layer a certain percentage of cation exchange resin particles. Even when the utmost care is exercised in forming the layers, one will generally find that the anion exchange resin layer contains about one volume percent or more of entrained cation exchange resin particles. Such entrainment of cation exchange resin particles is practically impossible to avoid due to the presence of fine particles in new cation exchange resin and to the subsequent production of fine cation resin particles during operation of the demineralizer.

After layering, the anion and cation exchange resins are preferably separated by removing at least one of the layers from the demineralizer to a suitable regenerating vessel. Means for removing the layers from the demineralizer to a reaction vessel are well known in the prior art and do not form a part of this invention.

As an alternative, the resins can be regenerated in the layer form in the demineralizer or a suitable regenerating vessel without physically separating the layers. In regenerating by this method, it is important to prevennt the cation regenerant, which is normally a strong acid from contacting the anion exchange resin since such contact results in chemical breakdown of the anion resin. This is readily accomplished by introducing the cation regenerant below the interface of the anion and cation layers so that the acid does not come in contact with the anion exchange resin. When using either regeneration embodiment, i.e., separation of layers or regeneration of overlying layers, the steps involved in regenerating a mixed bed demineralizer according to this invention are the same.

After resolving the mixed bed into layers as described above, and separating the layers, as preferred, the anion exchange resin containing entrained cation exchange resin particles is regenerated by passing therethrough a solution of sodium hydroxide. The hydroxide ions thereof replace the held anions such as for example, chlorides and the like which have been separated from the condensate during demineralizer operations and the anion exchange resin is regenerated to its hydroxide form. Entrained cation exchange resin particles are converted by the caustic regenerant to the sodium form.

After caustic regeneration the anion exchange resin layer is further contacted with a solution containing cations having a greater rational thermodynamic equilibrium constant than the ammonium ion thereby to replace the sodium ions held by the entrained cation exchange resin particles with the cations of the solution. Such contact with the solution does not affect the already regenerated anion exchange resin.

The rational thermodynamic equilibrium constant is defined by Helfferich in "Ion Exchange" (1962) at p. 169. The rational thermodynamic equilibrium constant is a value assigned to various cations and is a measure of the rate at which such cations replace lithium ion on sulfonated polystyrenes of varying degrees of cross-linking. The higher the constant the more readily the cation exchanges the lithium ion. The rational thermodynamic equilibrium constant of lithium is arbitrarily assigned a value of 1.00.

It has been observed that a cation having a higher thermodynamic equilibrium constant will exchange a cation having a lower thermodynamic equilibrium constant. The closer the equilibrium constant of the exchanging ion is to the equilibrium constant of the exchanged ion, the greater concentration of the exchanging ion that is required to replace the exchanged ion. It is further observed that the greater the equilibrium constant value for a cation the more difficult such cation is regenerated.

With the above observations in mind, the following table shows the rational thermodynamic equilibrium constant for various cations.

TABLE A

| | |
|---|---|
| Lithium | 1.00 |
| Sodium | 1.98 |
| Ammonium | 2.55 |
| Calcium | 5.16 |
| Silver | 8.51 |
| Lead | 9.91 |
| Barium | 11.05 |
| Tellurium | 12.04 |

From the above table it can be seen that solutions containing cations of calcium, barium, lead, silver and tellurium are suitale for use in this invention. However, barium, silver, lead and tellurium are difficult to remove from a resin because of their high rational thermodynamic equilibrium constants and, therefore, special procedures are required for the regeneration of resins having these ions attached. Calcium, on the other hand, is preferred for use in this invention since its equilibrium constant is higher than sodium and higher than the ammonium cation while at the same time a resin having calcium ions attached thereto is readily regenerated by acid. The importance of using a cation having a higher equilibrium constant than the ammonium cation becomes clear when it is consider that the condensate being treated contains ammonium hydroxide in order to avoid corrosion of metal parts in contact with the condensate and that therefore if the entrained cation exchange resin particles were treated so as to replace the held sodium ions with a cation having a lower equilibrium constant than the ammonium ion, during condensate demineralization the ammonium ion would replace the cation causing it to bleed into the condensate effluent thereby adding to the problem rather than correcting it.

The preferred solution for treating the regenerated anion exchange resin layer in accordance with this invention is a solution of calcium hydroxide. In addition to providing a cation having a proper thermodynamic equilibrium constant, the calcium hydroxide is relatively inexpensive and easy to handle. The strength of the lime solution is not critical to this invention and may range from a few parts per million calcium to a saturated solution which is about .04 normal. The volume of calcium solution used to treat the regenerated anion exchange resin layer depends on the concentration of the lime solution, it being important only that the anion exchange resin layer will be subjected to sufficient calcium to replace the sodium ions held by the entrained cation exchange resin particles. This can be readily determined from the volume of the anion exchange resin, the percentage of entrained cation exchange resin particles, and the capacity of the cation exchange resin.

It is highly preferred to subject the anion exchange resin layer to an excess of lime solution in order to insure that the entrained cation exchange resin particles have been contacted with sufficient calcium cations and to further wash out any excess caustic solution present from the regenerating operation.

While the foregoing discussion relates to the use of a calcium ion solution to replace sodium ions on the entrained cation exchange resin particles it should be clear that the same principles will hold true of solutions of the aforementioned other ions having rational thermodynamic equilibrium constants greater than that of the ammonium ion.

The cation exchange resin is regenerated with a strong acid such as sulfuric acid or hydrochloric acid in a conventional manner with care being taken to prevent contact of the anion exchange resin by the regenerate acid. As was pointed out above, such undesired contact of the cation exchange resin by the anion resin regenerant may be prevented by means known in the art, such as for example, by separating the anion exchange layer from the cation exchange layer or by regenerating while the layers are in contact with each other by providing a fluid dam at the interface of the layers or by introducing the acid at some point below the interface of the layers. After regeneration of the cation exchange resin layer, the excess acid regenerate is washed out and the regenerated exchange resins are intermixed to reform the mixed bed of the demineralizer.

The following examples are by way of illustration of a preferred embodiment of this invention and it is not intended that the invention be limited to the details therein set forth.

EXAMPLE I

In order to test the effectiveness of the regeneration method of this invention in reducing sodium leakage, two batches of anion exchange resin were made up to simulate the anion exchange resin layer containing entrained cation exchange resin particles that would be encountered in actual operation. Each batch comprised 400 ml. of which 1% by volume comprised fine particles ($-40 +60$ mesh) of a strong acid polystyrene-divinylbenzene cation exchange resin. The anion exchange resin was in the form of beads having a particle size of about $-16 +40$ mesh and was a strong base polystyrene resin cross-linked with ethylene glycol dimethacrylate. Each batch was regenerated with a 5% solution of sodium hydroxide at a rate of 20 lb./ft.$^3$ to put the anion exchange resin into the hydroxide form. Each batch then rinsed with demineralized water to eliminate any excess caustic solution.

One batch was further treated with 500 ml. of a 0.032 N lime solution and rinsed with demineralized water to remove any excess lime solution. The lime treatment used in this case was 100% excess based on a 2.0 meq./ml. capacity for the cation exchanger.

Each batch was placed in a one inch ID column and checked for sodium ion leakage by means of passing high purity demineralized water, having a resistivity of greater than 10 megohms/cm. and which was ammoniated to a pH of 9.0. The flow rate of the test water through the column was set at about 450 ml./min.

A total of approximately 100 liters of ammoniated demineralized water was put through each column and samples were taken after passage of about 80, 85, 90 and 95 liters through the column. Each sample was analyzed for sodium content using a Jarrell ash fully compensated atomic absorption spectrometer. Sodium ion was detected at 589.3 millimicron wave length. The sodium ion content was reported in parts per billion as $CaCo_3$.

Effluent from the column containing the first anion exchange resin batch which was not lime treated in accordance with this invention showed an average sodium ion content of 40 p.p.b. sodium. Samples of the effluent from the batch which had been lime treated in accordance with this invention after caustic regeneration showed a sodium leakage of less than 5 p.p.b.

EXAMPLE II

Two anion exchange resin batches were regenerated in the manner of Example I and tested for sodium ion leakage after one batch was treated with lime solution in accordance with this invention. The tests were modified however, in order to make the conditions more severe, in that each batch of anion exchange resin contained 5 volume percent of entrained cation exchange resin and the demineralized water was ammoniated to a pH of 9.6. Otherwise the test methods, materials and procedures were as set forth in Example I.

Analysis of samples from both columns showed that the anion exchange resin regenerated with caustic leaked an average of about 2600 p.p.b. of sodium. The anion exchange resin batch regenerated in accordance with this invention showed a sodium leakage of less than 5 p.p.b..

EXAMPLE III

Approximately 200 ml. of the anion exchange resin of Example I containing about 1% of entrained cation exchange resin as in Example I was regenerated with a caustic solution and further treated with lime solution in the manner of Example I. The regenerated anion exchange resin was then mixed on a 1 to 1 volume basis with approximately 200 ml. of C–240 strong acid cation exchange resin beads in the hydrogen form, said beads having a particle size of about −16 +40 mesh. The mixed ion exchange resins were placed in a 1 inch ID column and tested with demineralized water ammoniated to a pH of about 9.0 as in Example I. The effluent samples are tested for sodium ion content as in Example I. In addition, the samples were tested for calcium ion content on the Jarrell ash spectrometer at wave length of 422.7. The sample showed sodium ion content of less than 5 p.p.b. and calcium ion content was below detectable limits.

An additional anion exchange resin batch was made up in the same manner except that it contained 5% entrained cation ion exchange resin particles and this batch was mixed on a 1 to 1 volume ratio with the C–240 cation exchange resin particles in the hydrogen form. This batch was tested in the manner of Example II with a demineralized water solution ammoniated to a pH of about 9.6. The resultant sodium leakage was less than 5 p.p.b. and the calcium leakage was less than 50 p.p.b. which is close to the detectable limits of the apparatus used to test for calcium ion concentration.

The results of the tests, as summarized in Table B below, indicate that regeneration of the anion exchange resin layer in accordance with this invention substantially reduces sodium leakage.

TABLE B

| Sample | Influent H₂O | Leakage p.p.b. CaCO₃ Na | Ca |
| --- | --- | --- | --- |
| Example I, No Lime Treatment. | Ammoniated to pH 9.0. | 400 | |
| Example I, Lime Treatment. | do. | <5 | |
| Example II, No Lime Treatment. | Ammoniated to pH 9.6. | 2,600 | |
| Example II, Lime Treatment. | do. | <5 | |
| Example III, 1–1 Volume Ratio with 1% Entrained Cation Resin in Anion Resin Portion During Regeneration, Lime Treatment. | Ammoniated to pH 9.0. | <5 | (¹) |
| Example III, 1–1 Volume Ratio with 5% Entrained Cation Resin in Anion Resin Portion During Regeneration, Lime Treatment. | Ammoniated to pH 9.6. | <5 | (¹) |

¹ Below detectable limits.

It can be readily seen that by regenerating the anion exchange resin layer in accordance with this invention, the sodium leakage is substantially reduced to highly acceptable limits when it is considered that 5 parts per billion and less sodium ion concentration in demineralized water is a highly desired level. In addition, there is no appreciable calcium ion leakage from a mixed bed regenerated in accordance with this invention.

From the foregoing description, it is readily apparent how the present invention accomplishes its various objectives. While the invention has been described and illustrated therewith with reference to certain preferred embodiments thereof, it is to be understood that it may be otherwise embodied within the scope of the appended claims.

I claim:

1. In a condensate purification process involving the flow of condensate through a demineralizer containing a mixed bed of anion and cation exchange resin thereby to effect the removal of anions and cations from said condensate, the method of regenerating said mixed bed whereby sodium leakage therefrom is substantially reduced, the method comprising the steps of resolving said mixed bed into a first layer, a major portion of which comprises anion exchange resin particles and a minor portion of which comprises entrained cation exchange resin particles, and a second layer comprising cation exchange resin particles, contacting at least said first layer with caustic solution to effect the regeneration thereof, contacting said first layer with lime solution to displace sodium ions with calcium ions on said entrained cation exchange resin particles, contacting said second layer with acid to effect the regeneration thereof, removing excess acid from said second layer and co-mixing said first layer and said second layer to form said mixed bed.

2. The method of claim 1 wherein said first layer is separated from said second layer prior to regenerating said layers.

3. The method of claim 1 wherein said mixed bed is resolved into said first layer and said second layer by means of backwashing and settling.

4. The method of claim 1 wherein said first layer is regenerated with an aqueous solution of sodium hydroxide.

5. The method of claim 1 wherein the concentration of lime solution ranges between about 0.005 and about 0.04 N.

6. The method of claim 1 wherein said first layer is contacted with an excess of said lime solution.

7. A method for regenerating a demineralizer containing a mixed bed consisting of anion exchange resin particles and cation exchange resin particles of greater density than said anion exchange resin particles, comprising the steps of backwashing said demineralizer to expand and float said bed and to stratify said bed into an upper and lower layer, said lower layer consisting essentially of cation exchange resin particles and said upper layer consisting essentially of said anion exchange resin particles and a minor proportion of entrained cation exchange resin particles, separating said upper and said lower layers, contacting said lower bed particles with acid, contacting said upper layer particles with a caustic solution thereby to effect regeneration of said anion exchange resin particles, contacting said upper layer particles with a basic solution containing cations having a rational thermodynamic equilibrium constant greater than the ammonium cation whereby said cations readily replace the sodium cations held by the entrapped cation exchange resin particles and resist replacement by cations having a lower rational thermodynamic equilibrium constant, thereby substantially reducing the leakage of cations during subsequent operation of said mixed bed demineralizer from said entrained cation exchange resin particles, washing said upper layer particles to remove excess caustic therefrom and washing said lower layer particles to remove excess cation regenerant therefrom, and mixing said upper layer and said lower layer particles thereby to form a mixed ion exchange bed.

8. The method of claim 7 wherein after caustic regeneration, said upper layer particles are contacted with a basic solution containing cations selected from the group of cations having greater rational thermodynamic equilibrium constants than the ammonium cation consisting of barium, calcium, lead, silver and tellurium.

9. The method of claim 7 wherein after caustic regeneration, said upper layer particles are contacted with a solution of calcium hydroxide.

10. The method of claim 9 wherein said upper layer particles are contacted with an excess of said calcium hydroxide solution required to replace the sodium ions held by said entrained cation exchange resin particles.

References Cited

UNITED STATES PATENTS

| | | | |
|---|---|---|---|
| 2,628,165 | 2/1953 | Bliss | 210—38 X |
| 2,692,244 | 10/1954 | Kunin et al. | 210—37 X |
| 3,186,940 | 6/1965 | Vajna | 210—37 X |
| 3,385,787 | 5/1968 | Crits et al. | 210—33 X |
| 3,388,058 | 6/1968 | Wirth | 210—37 X |
| 3,414,508 | 12/1968 | Applebaum et al. | 210—37 X |
| 3,429,835 | 2/1969 | Odland | 210—32 X |

REUBEN FRIEDMAN, Primary Examiner

C. M. DITLOW, Assistant Examiner

U.S. Cl. X.R.

210—35, 37, 38; 260—2.1

Notice of Adverse Decision in Interference

In Interference No. 97,584 involving Patent No. 3,501,401, C. Calmon, CONDENSATION PURIFICATION PROCESS, final judgment adverse to the patentee was rendered May 19, 1972, as to claims 1 through 10.

[*Official Gazette July 4, 1972.*]